March 25, 1958 — R. R. HUNT — 2,827,730
FISH LURE RETRIEVER
Filed July 28, 1955
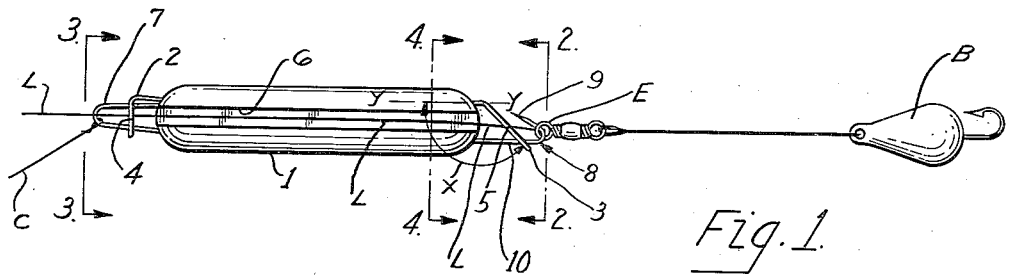
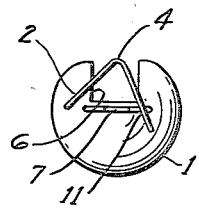
Fig. 3.
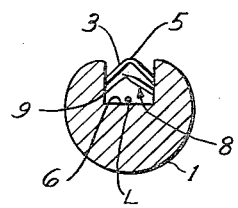
Fig. 4.
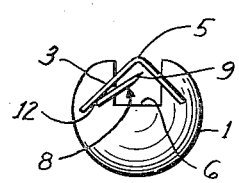
Fig. 2.
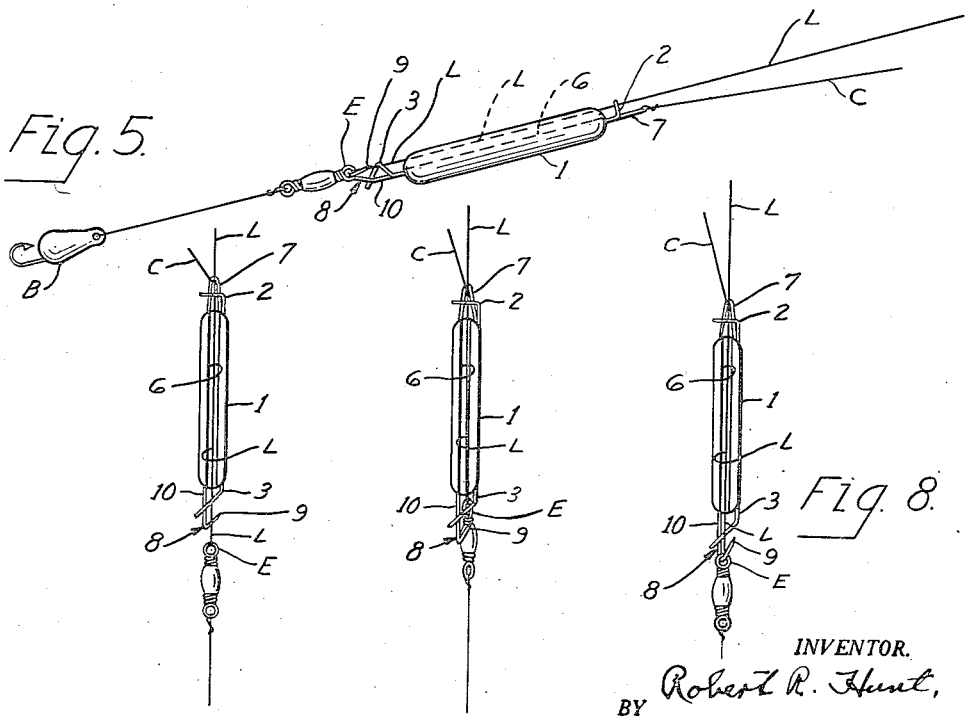
INVENTOR.
Robert R. Hunt,
BY Gehr & Leonard,
his ATTORNEYS.

United States Patent Office 2,827,730
Patented Mar. 25, 1958

2,827,730

FISH LURE RETRIEVER

Robert Roland Hunt, Cleveland, Ohio

Application July 28, 1955, Serial No. 524,975

9 Claims. (Cl. 43—17.2)

This invention relates to a fishing tackle and lure retriever and particularly to a retriever which can be lowered along a fishing line and caused to connect positively with the eyelet of a leader, lure, or hook on the line, and fasten itself thereto so that force can be applied for disengaging a hook from a snag without imposing a stress on the line.

The present device is particularly desirable and useful in connection with spinning tackle in which the light single strand line of high quality customarily used is apt to be damaged by over-stressing in attempts to dislodge lures and hooks by excessive tension exerted on the line itself.

The device comprises essentially an elongated weight having, near its ends, guides which engage a line so as to suspend the weight from the line in substantial parallelism therewith and with the center of gravity below the line for sliding therealong. A hook is arranged on one end of the weight with its point so related to the adjacent one of the guides that, as the weight slides down the line, the hook can pass in close proximity to and to a point downwardly beyond, the eye of the hook, lure, or leader swivel, and position itself relative thereto so as to enter and engage the eye upon return of the weight upwardly along its guided path on the line in a direction toward the fishing rod.

Various objects and advantages of the invention will become apparent from the following description wherein reference is made to the drawings, in which:

Fig. 1 is a top plan view of a fish lure retriever embodying the principles of the present invention;

Figs. 2 and 3 are right and left end elevations, respectively, of the device illustrated in Fig. 1;

Fig. 4 is a cross sectional view of the device taken on line 4—4 of Fig. 1;

Fig. 5 is a diagrammatic illustration showing the operation of the device;

Figs. 6, 7 and 8 are fragmentary diagrammatic illustrations showing the manner in which the retriever connects with the eyelet of a fishing lure, hook, or leader swivel, Fig. 6 showing the device as it is being lowered along the line, just at the instant its hook touches the eyelet; Fig. 7 showing the position of the device immediately after its hook has passed the eyelet; and Fig. 8 showing the position of the device when it has been pulled back toward the operator just to the point at which the point of its hook has entered the eyelet.

Referring to the drawings, the device comprises an elongated weight 1, preferably of lead, which is provided at its ends with guides 2 and 3, respectively. These guides may be in the form of bent wires which slope upwardly from one side of the weight to a point close to or above the upper surface of the weight and thence downwardly toward the other side of the weight. The guides are provided with abrupt bends which provide guideways 4 and 5, respectively, for fishing line, indicated at L. The guideways are positioned above the center of gravity of the weight in the normal operating position of the weight wherein the weight is suspended from, and in parallelism with, the line L.

For compactness it is desirable that the guideways 4 and 5 be close to the upper surface of the weight when the weight is suspended by a line passing through the guideways. Therefore, the weight is formed with a longitudinal channel 6 which opens upwardly and which is open at its ends. The channel 6 is coextensive in length with the weight 1. The guides 2 and 3 extend cross-wise of the channel 6 and are located so that their guideways 4 and 5 are close to the upper open side of the channel. The guideways may be slightly above, at, or slightly below, the upper surface of the weight. Thus the line L can be accommodated in, and extend lengthwise through, the channel 6 when the retriever or weight is suspended from the line by means of the guides 2 and 3. Since the center of gravity of the weight is below the guideways 4 and 5, the weight always hangs suspended from the line L.

At one of its ends the weight 1 is provided with a suitable eyelet or connector 7 to which a line of heavy cord C is secured. At its opposite end, the weight 1 is provided with a hook 8 having a point, indicated at 9, and a shank, indicated at 10. One arm or part of the connector 7 preferably is lightly in contact with, or close to, the free end of the guide 2, as indicated at 11, so that the connector 7 assists in preventing the line from slipping out from under the guide 2. Correspondingly, the shank 10 of the hook engages, or is close to, the free end portion of the guide 3, as indicated at 12, for the same purpose. The hook 8 opens back toward the end of the weight and is so arranged that its shank is below the level of the guideway 5. The free end or point 9 of the hook, however, is positioned outwardly beyond the adjacent end of the weight and preferably beyond the adjacent guideway 5 in a direction away from the end of the weight. It lies within the area bounded by the projection, endwise of the channel, of the guide 3 and the sides and bottom of the channel 6. Preferably the point 9 is in alignment with the end of the channel and close to the line defined by the guideways 4 and 5 so that the hook is guided in a position to catch into the eyelet of a hook, lure, or swivel of a leader as the weight is slid along the line L. The guide 3 is inclined away from the adjacent end of the weight at an angle "X" to a line Y—Y which is parallel to the line of the guideways, beginning at the side of the weight opposite from the side at which the shank 10 is located. The angle "X" preferably is from about 115° to 155°, 135° being particularly desirable.

This inclination assists in guiding an eyelet and tilting it to a position in which the point can more readily enter.

Quite often, in fishing, a leader is used between the lure and remainder of the line and is connected to the line by a swivel and it is desirable that the retriever pass beyond the swivel on the upper end of the leader down to the eyelet on the hook or lure by which it is fastened to the leader or to the "safety-pin" catch on the lower end of the leader. Accordingly, the channel is made of sufficient width and depth to permit the passage of the swivel end foremost therethrough.

The portion of the hook 8 between its shank 10 and point 9 preferably is tilted transversely of the channel so that it slopes upwardly from the shank, to the point 9, as best illustrated in Figs. 2 and 4.

In operation, assuming a lure B is snagged, the line is tightened up so as to provide a downward slope of a few degrees from its upper end entirely to the lure. The line is then snapped past the connector 7 and hook shank 10 into a position such that it passes beneath the guideways 4 and 5 and through the channel 6. With the weight thus suspended from the line L, the heavy cord C is fed out, allowing the weight to slide down the line L, guided by the guides 2 and 3. The weight is allowed to slide down the line L until it strikes the lure, this being evidenced by the fact that no more slack in the cord C can be taken up. When the weight is in the position described, the point 9 of the hook 8 is just below the eyelet E to be engaged. The cord C is then pulled so as to slide the retriever back up the line an inch or so at a moderate steady rate. This movement first causes the portion of the guide 3 that is inclined away from the end of the weight to engage and tilt the eyelet into convenient position for the point 9 to enter the eyelet and then causes the hook 8 to enter the eyelet. The tilted portion of the hook between its shank and its point also acts as a cam which, as the hook passes the eyelet while the weight is moving down the line L, engages the eyelet and swings the weight laterally about the line L as an axis so as to assure relative passage of the hook 8 and eyelet. When the hook 8 is entirely past the eyelet, the weight 1 restores the hook to its original position wherein its point 9 is close to the line L and in position to enter the eyelet when the weight is slid back up the line L.

The hooking of the hook 8 in the eyelet E is readily evidenced by abrupt tightening of the cord C.

If engagement of the hook in the eyelet is not effected, the cord C is slacked off, allowing the retriever to slide down the line again, and the operation is repeated. By a few short alternate downward and upward movements of the retriever, the hook 8 will enter the eyelet E. Usually not more than two or three attempts are necessary and very frequently the hook enters the eyelet on the first attempt.

The hook is such that it will withstand a pull many times that necessary to release the lure, even if release must be effected by straightening the snagged hook of the lure. The cord C is correspondingly heavier than the fishing line.

Having thus described my invention, I claim:

1. A retriever for the purposes described comprising a weight, spaced guides on the weight and having guideways, respectively, adapted to engage a fishing line for suspending the weight therefrom for sliding movement endwise of the guideways along the line with the center of gravity of the weight below the line defined by the guideways, means for connecting the weight to a cord for pulling the weight along the line when the line is accommodated in the guideways, a hook in fixed position relative to the guides and positioned, endwise of the guideways, outwardly from the guides and having a shank and point, both positioned so as to be normally below the level of the line defined by the guideways when the weight is in suspended position, said hook opening upwardly toward the line defined by the guideways and back toward the guides, and the point of the hook being close to the line defined by the guideways.

2. A retriever according to claim 1 characterized in that the hook has a portion, between its shank and point, which slopes upwardly transversely of the line defined by the guideways and away from the shank toward the point.

3. A retriever according to claim 1 characterized in that the point of the hook is substantially on the line defined by the guideways.

4. A retriever for the purposes described comprising a weight having therein a channel open at its ends and, for its full length, at the top surface of the weight, guides near the ends of the channel, respectively, said guides having guideways with open sides facing the base of the channel, said guideways defining a line parallel with the channel and adapted to slidably accommodate a fish line, a hook near one end of the channel, said hook being spaced, endwise of the guideways, outwardly from the end of the weight and opening back toward said end of the channel and having its point within the area bounded by the projection, endwise of the channel, of the guide which is near said one end of the channel and the sides and bottom of the channel.

5. A retriever for the purposes described comprising a weight, spaced guides on the weight near the ends thereof and having guideways, respectively, adapted to engage a fishing line for suspending the weight therefrom for sliding movement along the line with the center of gravity of the weight below the line defined by the guideways, means for connecting the weight to a cord for pulling the weight along the line when the line is accommodated in the guideways, a hook in fixed position relative to the weight at one end thereof and positioned, endwise of the guideways, outwardly from said one end of the weight and having a shank and a point, the shank being offset laterally of the weight from the point and being positioned so as to be normally below the level of the guideways when the weight is in suspended position, said hook opening back toward said one end of the weight, the point of the hook being close to the line defined by the guide, the guideway near said one end of the weight being nearer the end of the weight than is the point, and the guide near said one end of the weight being inclined away from said one end at an angle greater than 115° and less than 155° to a line parallel to the line of the guideways, beginning at the side of the weight opposite from the side at which the shank of the hook is located.

6. A retriever according to claim 1 characterized in that the guide nearer the hook has a portion inclined endwise of the guideway and adapted to be engaged by an eyelet on the line as the weight is moved down the line and operative when so engaged to swing the weight laterally a predetermined amount about the fishing line.

7. A retriever according to claim 6 characterized in that said portion of the guide is disposed, endwise of the guideways between the point of the hook and the weight and is close to the point of the hook.

8. A retrieving device for snagged fishing plugs adapted for passage along a fish line to the eye of a line-attaching swivel connected to a plug, said retrieving device comprising: a body adapted to move by gravitation along said line to the swivel of a snagged plug; guiding means on said body adapted for rotating said eye to a selected position; eye-engaging means projecting from the body adjacent the guide means and adapted to enter said eye when the eye is in said position; and a retrieving cord connected to said body.

9. A retrieving device for snagged fishing plugs adapted for passage along a fish line to the eye of a line-attaching swivel connected to a plug, said retrieving device comprising: a body having an end-to-end slot adapted to receive said line, for gravitational movement of the body along the line to the snagged plug; an elongated guide foot projecting forwardly from said body and adapted for turning the swivel eye to a predetermined position as the body approaches the plug; an elongated member also projecting forwardly from the body and adapted to enter the eye when the eye is in said position; and a retrieving cord connected to said body.

References Cited in the file of this patent

UNITED STATES PATENTS

| | | |
|---|---|---|
| 2,597,229 | Cox | May 20, 1952 |
| 2,609,632 | Davis | Sept. 9, 1952 |